United States Patent
Kaneda et al.

Patent Number: 5,609,013
Date of Patent: Mar. 11, 1997

[54] STEEL CORDS FOR THE REINFORCEMENT OF RUBBER ARTICLES

[75] Inventors: Akihiro Kaneda; Koichi Yokota; Masao Nakamura, all of Kuroiso, Japan

[73] Assignee: Bridgestone Bekaert Steel Cord Co., Ltd., Tokyo, Japan

[21] Appl. No.: 383,178

[22] Filed: Feb. 3, 1995

Related U.S. Application Data

[63] Continuation-in-part of Ser. No. 163,696, Dec. 9, 1993, abandoned.

[30] Foreign Application Priority Data

Dec. 10, 1992 [JP] Japan ................................ 4-330706

[51] Int. Cl.⁶ ............................ D02G 3/02; D02G 3/36
[52] U.S. Cl. ............................ 57/200; 57/212; 57/236; 57/242; 57/902
[58] Field of Search ........................... 57/212, 236, 242, 57/902, 200; 148/320, 599; 72/467

[56] References Cited

U.S. PATENT DOCUMENTS

| | | | |
|---|---|---|---|
| 2,349,652 | 5/1944 | Fenner | 72/467 |
| 2,383,118 | 8/1945 | Ferenci | 72/467 X |
| 4,883,545 | 11/1989 | Matlock et al. | 148/599 X |
| 4,966,216 | 10/1990 | Kawasaki et al. | 57/902 X |
| 5,248,353 | 9/1993 | Nishida et al. | 148/599 X |

FOREIGN PATENT DOCUMENTS

| | | |
|---|---|---|
| 51-31612 | 3/1976 | Japan . |
| 53-76917 | 7/1978 | Japan . |
| 57-116753 | 1/1982 | Japan . |

*Primary Examiner*—William Stryjewski
*Attorney, Agent, or Firm*—Sughrue, Mion, Zinn, Macpeak & Seas

[57] ABSTRACT

A steel cord for the reinforcement of rubber articles is formed by twisting plural filament wires of a high carbon steel. In this case, the filament wire is drawn from a wire rod so as to satisfy a relationship of $T \geq 230-148 \log D$ (wherein D is a diameter of the filament wire and T is a tensile strength of the filament wire) and a difference in tensile strength between a surface layer portion and an internal portion in the filament wire of not more than 80 kgf/mm².

3 Claims, 3 Drawing Sheets

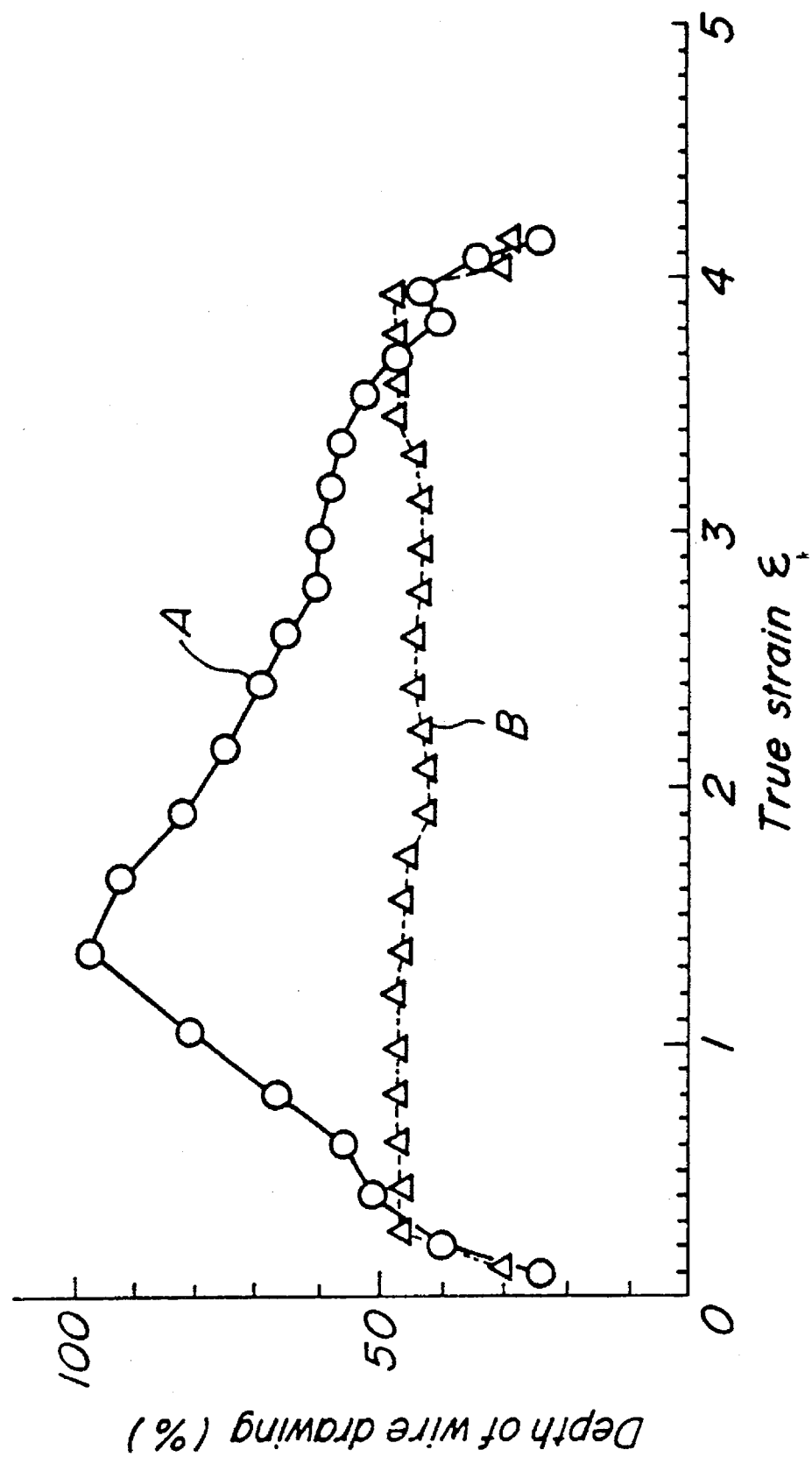
FIG_3

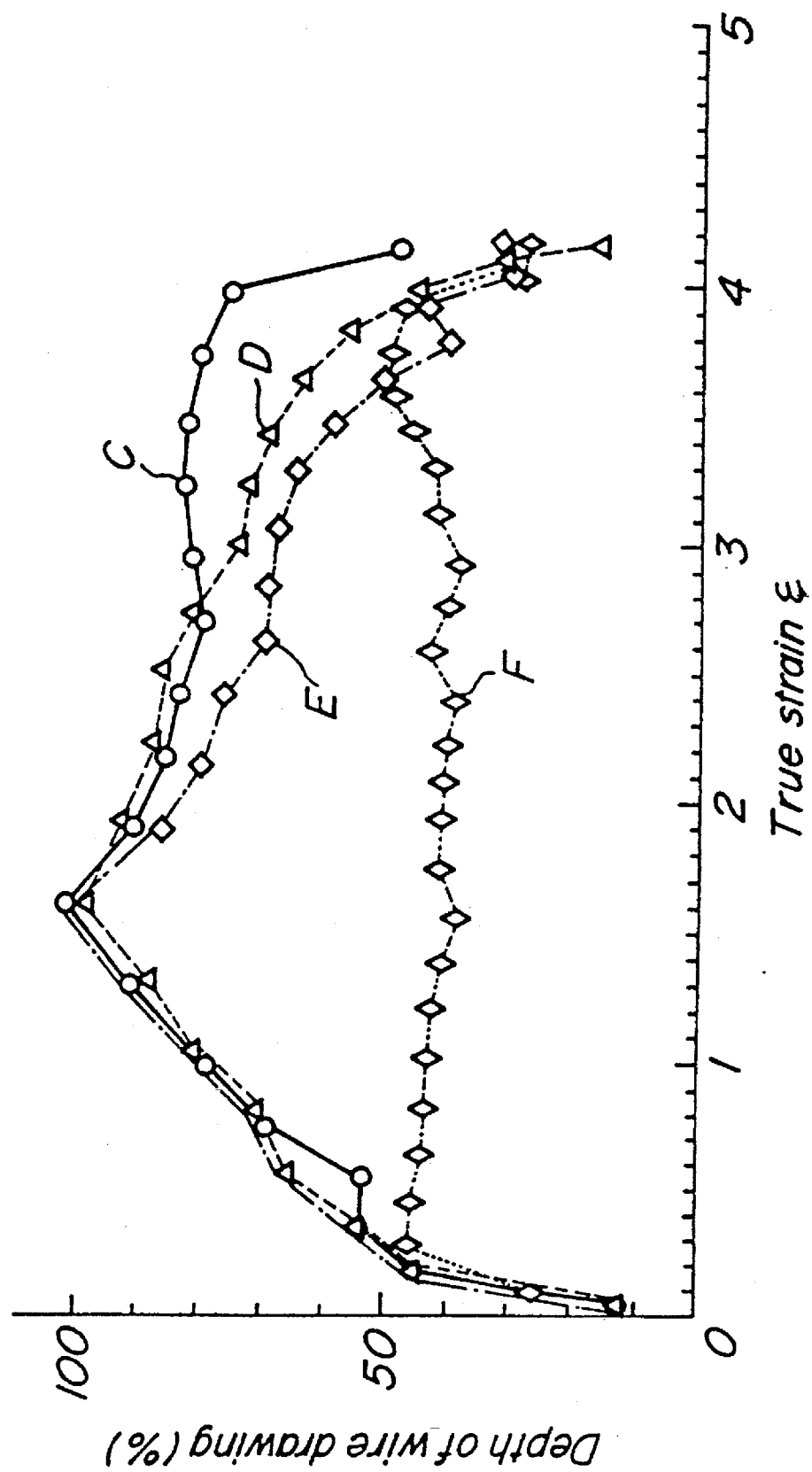

ative to increase the tensile strength of the steel
STEEL CORDS FOR THE REINFORCEMENT OF RUBBER ARTICLES This application is a continuation-in-part of the application Ser. No. 08/163,696 filed Dec. 9, 1993, now abandoned.

BACKGROUND OF THE INVENTION

1. Field of the Invention

This invention relates to steel cords usable as a reinforcing material for rubber articles such as pneumatic tires, conveyer belts and the like, and more particularly to a steel cord having a high tensile strength and excellent ductility for attaining reduction of weight and improvement of durability in a composite rubber body.

2. Description of the Related Art

In order to reduce the weight of the rubber article, it is advantageous to increase the tensile strength of the steel cord to reinforce the rubber article with less or thinner steel cords. On the other hand, in order to improve the durability of the rubber article, it is advantageous to improve the fatigue resistance of the steel cord. For this end, it is strongly demanded to improve the tensile strength and fatigue resistance of the steel cord. Further, in order to economically produce such steel cords, it is important to ensure the ductility of each steel filament wire constituting the steel cord to prevent the occurrence of wire breakage during twisting.

As a technique for improving the tensile strength of the steel cord, there are proposed a technique wherein a carbon content of a wire rod as a starting material for the steel cord is made higher than that of an ordinary wire rod, a technique wherein a wire drawing ratio of the wire rod is increased, and the like. However, the increase of the carbon content or the wire drawing ratio in the wire rod produces a new problem of degrading the fatigue resistance of the steel cord. For this end, in order to improve the fatigue resistance of the steel cord, it is attempted to render the composition of the wire rod as a starting material for the steel cord into a high alloy to form a fine pearlite structure, or to decrease the amount of non-metal inclusion in the wire rod, or the like.

However, expensive elements are used in alloying, so that the cost of the starting material for the steel cord undesirably rises. On the other hand, when the non-metal inclusion is decreased in the wire rod as far as possible, the production steps become complicated to increase the production cost. In any case, these techniques are disadvantageous in view of economical reasons. Even when such a wire rod is used to produce steel cords, the high tensile strength and good fatigue resistance are not necessarily satisfied at the same time. Especially, the degradation of the fatigue resistance is a serious problem in rubber articles such as tires and the like subjected to repetitive bending under loading because some of the steel filament wires constituting the steel cord are broken by the repetitive bending to bring about the occurrence of cord breakage and hence result in fatigue breakage of the composite rubber body or the tire.

SUMMARY OF THE INVENTION

It is, therefore, an object of the invention to provide steel cords simultaneously establishing a high tensile strength and an excellent fatigue resistance.

The inventors have made various studies using wire rods usually used in the steel cord with respect to the relationship between tensile strength and fatigue resistance in the steel filament wire constituting the steel cord and found out that when the wire drawing ratio of the steel filament wire constituting the steel cord is increased to enhance the tensile strength, as the wire drawing ratio becomes high, the wire drawing ratio in the surface layer portion in the steel filament wire is increased as compared with that of the central portion in the wire to increase the tensile strength of the surface layer portion. Moreover, it is known that ductility is degraded when the tensile strength of the filament wire constituting the steel cord is increased over a certain level. This relationship is considered to be applied to the relationship among tensile strengths of the central portion and the surface layer portion in the filament wire and the ductility. In this connection, it has newly been found that when the tensile strength of the surface layer portion is increased over a certain level as compared with that of the central portion, the filament wire is apt to be broken during twisting to bring about the reduction of the productivity and the degradation of fatigue resistance in the steel cord subjected to repetitive torsion in use of the rubber article, and as a result the invention has been accomplished.

According to the invention, there is the provision of a steel cord for the reinforcement of rubber articles formed by dry-drawing a wire rod of high carbon steel comprising C: 0.78–0.90% by weight, Si: 0.10–0.30% by weight, Mn: 0.30–0.55% by weight and the remainder being iron and inevitable impurities, subjecting the drawn wire to a patenting treatment, wet-drawing to a given diameter according to such a die path schedule that a depth of wire drawing becomes maximum at a true strain in wire drawing of 1–2, and twisting a plurality of the resulting drawn filament wires, in which all of the filament wires satisfy a relationship of $T \geq 230-148 \log D$, wherein D is a diameter (mm) of the filament wire and T is a tensile strength (kgf/mm$^2$) of the filament wire, and a difference in tensile strength between a surface layer portion and an internal portion in the filament wire is not more than 80 kgf/mm$^2$.

The term "surface layer portion of filament wire" used herein means a cylindrical portion of the filament wire occupying 20% of a cross-sectional area of the filament wire in form of a concentric circle from the surface of the filament wire, while the term "internal portion of filament wire" means a column portion occupying 80% of the cross-sectional area of the filament wire in form of a column from the center of the filament wire. That is, when the diameter of the filament wire is D, the surface layer portion is represented by $(D/2)^2\pi - (0.894D/2)^2\pi$ and the internal portion is represented by $(0.894D/2)^2\pi$.

BRIEF DESCRIPTION OF THE DRAWINGS

FIG. 3 is a graph showing an embodiment of a die path schedule in wet-drawing; and FIG. 4 is a graph showing another embodiment of a die path schedule in wet-drawing.

DESCRIPTION OF THE PREFERRED EMBODIMENTS

Figure 1:
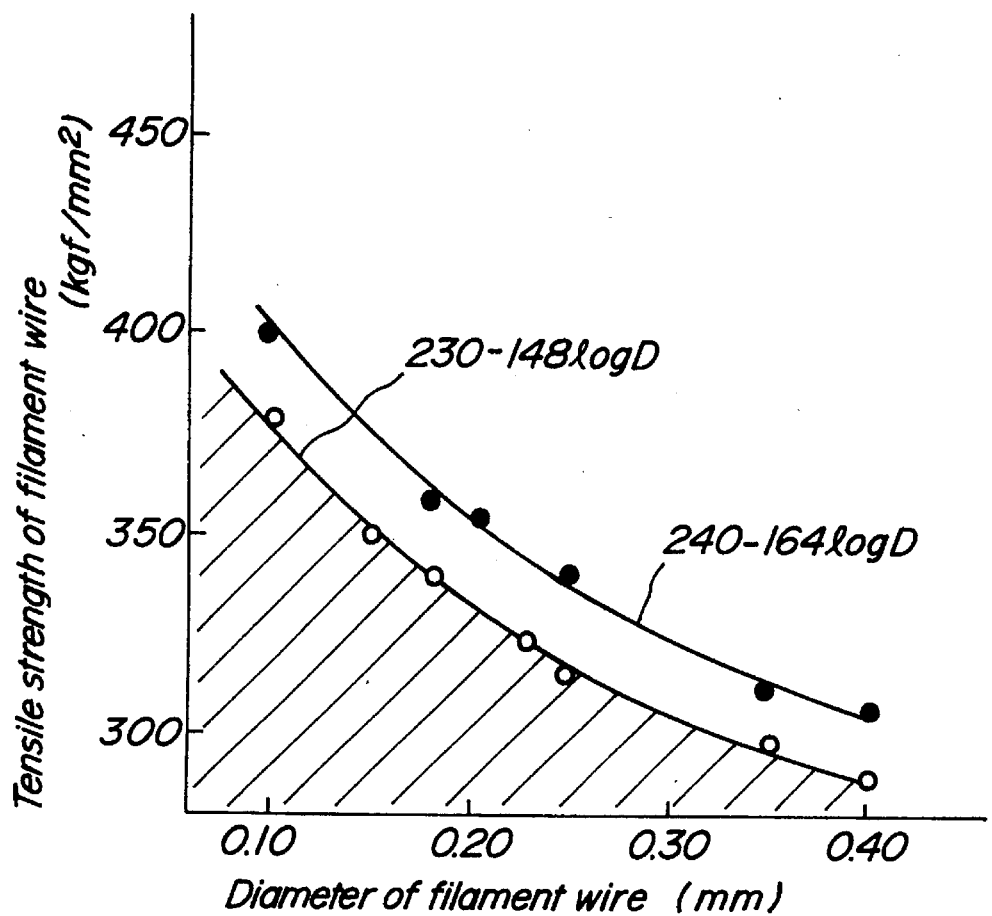
FIG. 1 is a graph showing a relationship between diameter and tensile strength in a filament wire.

According to the invention, wire rods usually used in the formation of steel cords are used because the rise of production cost in the formation of the steel cord can easily be controlled. They have a composition of C: 0.78–0.90% by weight, Si: 0.10–0.30% by weight, Mn: 0.30–0.55% by weight and the remainder being iron and inevitable impurities as mentioned below.

When the C amount is less than 0.78% by weight, it is difficult to render the tensile strength of the filament wire into a target level while controlling the wire breakage in the drawing, while when it exceeds 0.90% by weight, proeutectoid cementite is apt to be generated in the patenting treatment, which results in the wire breakage during the drawing and the twisting.

When the Si amount is less than 0.10% by weight, it is insufficient to strengthen the ferrite matrix, while when it exceeds 0.30% by weight, the hardening of ferrite matrix is too promoted and hence it is impossible to conduct a high wire drawing.

When the Mn amount is less than 0.30% by weight, it is insufficient to ensure the hardenability in the patenting and a given tensile strength is not obtained, while when it exceeds 0.55% by weight, the segregation tendency is strong and the high wire drawing is impossible and the desired tensile strength is not obtained.

Desirably the amount of inevitable impurities is reduced as far as possible. Particularly, the presence of non-metal inclusion badly affects the wire drawability.

According to the invention, the wire rod is finally drawn to a diameter of 0.15–0.40 mm by wet-drawing. When the diameter in the filament wire is less than 0.15 mm, the cost of the wire drawing undesirably increases and is not economical, while when it exceeds 0.40 mm, fatigue resistance is considerably degraded.

The tensile strength of the filament wire constituting the steel cord is mainly dependent upon the tensile strength of the wire rod after the final heat treatment and the wire drawing ratio at a subsequent step. Particularly, the contribution of the wire drawing ratio is large, so that the tensile strength of the filament wire is considered to be approximately proportional to the wire drawing ratio. However, when wire drawing is conducted at a value exceeding a certain level, the filament wire is broken in the course of the drawing, so that there is an upper limit in the wire drawing ratio. That is, the wire drawing capable of providing a high tensile strength without breakage of the filament wire is restricted to a very narrow range. Therefore, the tensile strength of the filament wire becomes proportional to the diameter of the filament wire.

Since the wire drawing ratio has an upper limit as mentioned above, the tensile strength T (kgf/mm$^2$) of the filament wire constituting the steel cord as the conventional product is within a shadowed region shown in FIG. 1 or a relationship between the diameter and the tensile strength in the filament wire of T<230–148 logD.

On the other hand, if it is intended to obtain a filament wire of T≧230–148 logD, sufficient strength can be given to a steel cord made from such filament wires. According to the invention, therefore, the tensile strength T of the filament wire constituting the steel cord is aimed to be T≧230–148 logD. Especially, when filament wires are applied to rubber articles such as tires or the like suffering severe use conditions, the tensile strength T is preferable to be T≧240–164 logD.

The filament wires having the above high tensile strength are possible to be produced theoretically or in laboratory. However, if the tensile strength is increased to T≧230–148 logD, the degradation of the fatigue resistance becomes conspicuous, so that steel cords as a product are not yet obtained from such filament wires. Namely, even when the high tensile strength is given to the filament wire, the fatigue resistance sufficient for practical use can not be maintained, so that steel cords having a high tensile strength are not obtained as a product.

The phenomenon of degrading the fatigue resistance when the tensile strength is particularly increased to T≧230–148 logD is due to the fact that the susceptivity to flaws becomes high in the surface layer portion of the filament wire. The inventors have made studies with respect to means for suppressing the increase of the susceptivity to flaws and found that the susceptivity to flaws can be decreased very advantageously by controlling the difference in tensile strength between the surface layer portion and the internal portion of the filament wire to not more than 80 kgf/mm$^2$, whereby the tensile strength of the filament wire can be increased to T≧230–148 logD.

In the filament wire after the drawing, the tensile strength of the surface layer portion is customary to be higher than that of the internal portion. As the difference in tensile strength between both the portions becomes large, the susceptivity to flaws becomes higher. When the difference in tensile strength exceeds 80 kgf/mm$^2$, the degradation of the fatigue resistance is considerably caused due to the increase in the susceptivity to flaws, so that it is necessary to control the difference in tensile strength to not more than 80 kgf/mm$^2$.

The tensile strength of the surface layer portion in the filament wire is determined as a difference between the tensile strengths before the dissolving treatment and after the dissolving treatment by measuring the tensile strength of the filament wire itself, dissolving the surface layer portion of the filament wire with an aqueous solution of 6% nitric acid by 20 volume % of the filament wire itself, measuring the tensile strength of the filament wire after the dissolving treatment.

In order to obtain the difference in tensile strength between the surface layer portion and the internal portion of not more than 80 kgf/mm$^2$, it is sufficient to conduct final drawing by continuous wet-drawing. At first, the filament wire is drawn in a lubricating liquid to control rise of temperature due to heat generation accompanied with the drawing. Then, the drawing conditions in the final drawing are restricted as mentioned below, whereby it is possible to produce drawn filament wires having a high tensile strength and an excellent fatigue resistance.

The wire drawing ratio of the filament wire changes in accordance with the reduction of area in the die and the approach angle α of the die, so that in order to equalize the wire drawing ratios in the surface layer portion and the internal portion of the wire filament, it is advantageous to adjust a depth of wire drawing considering the reduction of area and the approach angle.

Figure 2:
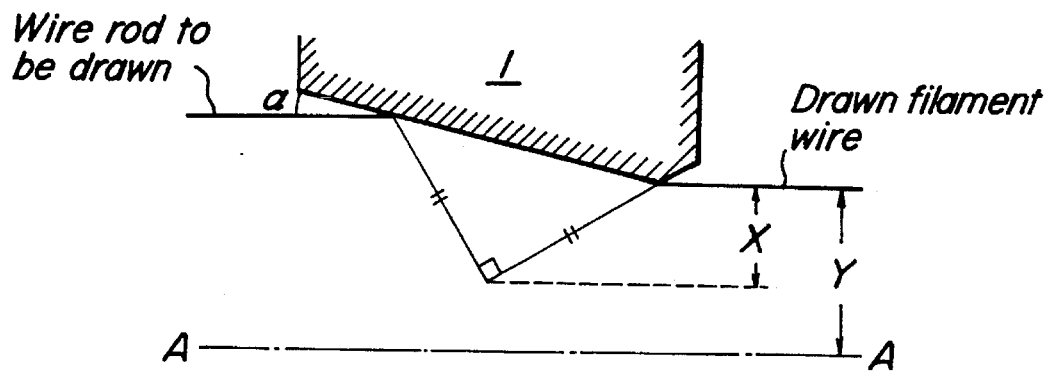
FIG. 2 is a schematic view illustrating a definition of depth of wire drawing.

The term "depth of wire drawing" used herein means a function for the reduction of area and approach angle in the die and is a simple measure for estimating a degree of compression stress applied to the filament wire from the surface thereof in a central direction in the drawing through a die. As shown in FIG. 2, the depth of wire drawing is represented by (X/Y)×100 when a distance from the surface of the filament wire drawn from a die 1 to the center axial line (A—A) thereof (i.e. a radius of the filament wire drawn from the die) is Y and a distance between the surface of the filament wire drawn from the die and a straight line depicted from a vertex of an isosceles triangle defined by using a portion of the filament wire contacting with an approaching part of the die having an approach angle α as a base in parallel with the center axial line of the filament wire is X. As the depth of wire drawing becomes large, the compression stress is uniformly applied from the surface of the filament wire to the inside thereof, whereby the difference in tensile strength between the surface layer portion and the internal portion in the filament wire can be reduced. For instance, when the approach angle α is 4.5° and the reduction of area is 27.06%, the depth of wire drawing is 100%, which means that the compression stress applied to the filament wire through the die reaches the center of the filament wire.

However, when the die path schedule is defined by rendering the depth of the wire drawing into constant value as shown by the conventional paths B and F in FIGS. 3 and 4, the surface smoothness of the filament wire is poor at initial stage of final drawing, so that the large depth of wire drawing causes the wire breakage due to poor lubrication. Also, the hardening of the filament wire is promoted at such a region that the true strain exceeds 2, so that the large depth of wire drawing brings about the temperature rise and hence the strength of the surface layer portion increases. Therefore, in order that the difference in tensile strength between the surface layer portion and the internal portion in the filament wire is not more than 80 kgf/mm², wire drawing is carried out according to a die path schedule as shown by paths A, C, D and E in FIGS. 3 and 4 in accordance with the true strain in the wire drawing. Moreover, the true strain ε in wire drawing is defined by the following equation:

$$\epsilon = 2 \ln(d_0/d_1)$$

wherein ln is a natural logarithm, $d_0$ is a diameter of filament wire before the wire drawing, and $d_1$ is a diameter of filament wire after the wire drawing.

As shown by the paths A, C, D and E in FIGS. 3 and 4, the depth of wire drawing and the reduction of area are made small at an initial stage of the wire drawing to smoothen the surface of the wire rod and then the depth of wire drawing is gradually made large to apply the compression stress to the internal portion of the filament wire. Since the hardening of the filament wire becomes conspicuous at such a region that the true strain exceeds 2.5, the reduction of area per die is made small at this region to suppress the heat generation, whereby the difference in tensile strength between the surface layer portion and the internal portion can be made small. Thus, the surface layer portion and the internal portion of the filament wire are subjected to wire drawing at approximately same level under the above wire drawing condition, whereby steel cords having an excellent fatigue resistance can be produced.

Moreover, the conditions for patenting treatment before the above wire drawing are not particularly restricted, but in order to establish the increase of tensile strength and the reduction of resistance to flaw in the filament wire, it is preferable that the grain size of pearlite crystal is not less than 9 as an ASTM crystal grain size number. In addition, it is desirable to prevent the decarburization on the surface layer portion of the filament wire as far as possible.

The following example is given in illustration of the invention and is not intended as limitation thereof.

A wire rod of 5.5 mm in diameter for the production of steel cords having a composition of C: 0.82 or 0.81% by weight, Si: 0.21% by weight, Mn: 0.49% by weight, P: 0.008% by weight, S: 0.007% by weight and Aℓ: 0.003% by weight is dry-drawn to a given wire diameter, subjected to a patenting treatment and a plating treatment for the improvement of adhesion to rubber and then subjected to a final wire drawing by means of a slip-type continuous wet-drawing machine, in which all dies other than a final die are immersed in a lubricating liquid, to obtain a drawn filament wire. In this case, brass plating consisting of 60–70% by weight of copper and 40–30% by weight of zinc is conducted as the plating for the improvement of adhesion to rubber.

The carbon content of the wire rod, patenting conditions, wet-drawing conditions and diameter, tensile strength and rotating bending fatigue limit of the resulting filament wire are shown in Table 1, respectively.

TABLE 1

| Run No. | 1 | 2 | 3 | 4 | 5 | 6 | 7 | 8 |
|---|---|---|---|---|---|---|---|---|
| Carbon content of wire rod (wt %) | 0.82 | 0.82 | 0.81 | 0.81 | 0.81 | 0.81 | 0.82 | 0.82 |
| Diameter of wire rod before patenting (mm) | 2.00 | 2.00 | 1.44 | 1.44 | 1.44 | 1.44 | 2.00 | 1.44 |
| Solid solution temperature (°C.) | 910 | 910 | 890 | 890 | 890 | 890 | 820 | 810 |
| Pearlite transformation temperature (°C.) | 600 | 600 | 600 | 600 | 600 | 600 | 580 | 580 |
| Grain size number of pearlite block | 9 | 9 | 10 | 10 | 10 | 10 | 11 | 11 |
| Tensile strength of wire rod after patenting (kgf/mm²) | 128 | 128 | 129 | 129 | 129 | 129 | 131 | 132 |
| Drawing ratio of wire rod after patenting (%) | 57 | 57 | 56 | 56 | 56 | 56 | 59 | 60 |
| Die path schedule in wet-type drawing | A | B | C | D | E | F | A | E |
| Die path number | 22 | 25 | 18 | 20 | 21 | 25 | 22 | 21 |
| Diameter of filament wire (mm) | 0.25 | 0.25 | 0.18 | 0.18 | 0.18 | 0.18 | 0.25 | 0.18 |
| Tensile strength of filament wire (kgf/mm²) | 406 | 379 | 416 | 410 | 408 | 378 | 397 | 401 |
| Rotating bending fatigue limit of filament wire (kgf/mm²) | 131 | 102 | 135 | 137 | 135 | 105 | 133 | 134 |
| Difference in tensile strength between surface layer portion and internal portion (kgf/mm²) | 52 | 162 | 44 | 50 | 57 | 148 | 42 | 30 |

In Run Nos. 7 and 8 of Table 1, in order to further fine the pearlite block size of the wire rod after the patenting, the wire rod is solid-soluted by heating to 900° at a heating rate of 200°/s and rapidly cooled to 50° to form a complete martensite structure and then subjected to the patenting treatment under the conditions shown in Table 1. Moreover, wet-drawing is conducted according to the die path schedule of paths A, C, D and E shown in FIGS. 3 and 4, while the wire drawing according to the conventional die path schedule of paths B and F bringing about the same level depth of wire drawing is conducted for the comparison.

Further, 1000 kg of steel cord with a 1×5 twisting structure is produced by twisting 5 filament wires in each of Run Nos. 1 and 2 of Table 1. In case of using the filament wire of Run No. 1, no wire breakage is caused during twisting, while in case of using the filament wire of Run No. 2, wire breakage is frequently caused and the steel cord can not be supplied at an economical level.

Next, the wire drawing is conducted by using a normal die and an abnormally worn die when die path schedule is set to a path A shown in FIG. 3 to obtain results as shown in Table 2.

TABLE 2

|  | Difference in tensile strength between surface layer portion and internal portion (kgf/mm$^2$) |
| --- | --- |
| Normal die | 38 |
| Abnormal worn die | 147 |

As seen from Table 2, since the abnormally worn die exhibits the depth of wire drawing different from the planning depth of wire drawing, the tensile strength of the surface layer portion in the filament wire becomes extremely high and the fatigue resistance of the filament wire is undesirably degraded.

As mentioned above, the steel cords according to the invention possess high tensile strength and excellent fatigue resistance, so that the reduction of weight and the improvement of durability in rubber articles can be attained by using such steel cords. Furthermore, no special device or jig is required when the wire rod for the production of the steel cord is subjected to drawing, which is advantageous from economical viewpoint.

What is claimed is:

1. A steel cord for the reinforcement of rubber articles formed by twisting a plurality of steel filament wires, each filament wire being formed by dry-drawing a wire rod of high carbon steel comprising C: 0.78–0.90% by weight, Si: 0.10–0.30% by weight, Mn: 0.30–0.55% by weight and the remainder being iron and inevitable impurities, subjecting the drawn wire to a finish patenting treatment and wet-drawing to a given diameter according to a die path schedule such that a reduction of area and approach angle in the die are selected to make a depth of wire drawing maximum at a true strain in wire drawing of 1 to 2, in which all of the filament wires satisfy a relationship of $T \geq 230-148 \log D$, wherein D is a diameter of the filament wire and T is a tensile strength of the filament wire, and a difference in tensile strength between a surface layer portion and an internal portion in the filament wire is not more than 80 kgf/mm$^2$.

2. A steel cord according to claim 1, wherein said filament wire satisfies a relationship of $T \geq 240-164 \log D$.

3. The steel cord of claim 1 wherein said wire rod is drawn to a diameter in the range of 0.15–0.40 mm.

* * * * *